United States Patent
Gautier et al.

[19]

[11] Patent Number: 6,138,548

[45] Date of Patent: Oct. 31, 2000

[54] PNEUMATIC SERVOMOTOR WITH CONTROLLED POWER-ASSIST POSITIONING

[75] Inventors: Jean-Pierre Gautier, Aulnay-SS-Bois; Cedric Leboisne, Paris; Jean-Pierre Michon, Saint Pathus; Ulysse Verbo, Aulnay-SS-Bois, all of France

[73] Assignee: Bosch Systemes de Freinage, Drancy, France

[21] Appl. No.: 09/269,987

[22] PCT Filed: Mar. 16, 1999

[86] PCT No.: PCT/FR99/00597

§ 371 Date: Apr. 5, 1999

§ 102(e) Date: Apr. 5, 1999

[87] PCT Pub. No.: WO99/48737

PCT Pub. Date: Sep. 30, 1999

[30] Foreign Application Priority Data

Mar. 23, 1998 [FR] France .................................. 98 03521

[51] Int. Cl.[7] .......................................................... F15B 9/10
[52] U.S. Cl. ................................................. 91/376 R; 91/35
[58] Field of Search ..................................... 91/35, 376 R

[56] References Cited

U.S. PATENT DOCUMENTS 5,647,462  7/1997  Tsubouchi et al. ..................... 188/356

*Primary Examiner*—Christopher Verdier
*Assistant Examiner*—Thomas E. Lazo
*Attorney, Agent, or Firm*—Leo H McCormick, Jr.; Warren Comstock

[57] ABSTRACT

The invention relates to a pneumatic booster operated by a plunger (9) housed in a bore (61) and carrying a moving seat (102) intended to interact selectively with a shut-off member (111), this member being itself capable of interacting selectively with a fixed seat (101).

According to the invention, the plunger (9) comprises a cylindrical body (91) and a collar (92) sliding between a front stop (911) and a rear stop (912) of the body, an anterior section (921) of the collar (92) being engaged between the cylindrical body (91) and the bore (61), a posterior section (922) of the collar (92) carrying the moving seat (102), and it being possible furthermore for the collar (92) to be held temporarily stationary in the bore independently of the movement of the body (91), by means of a channel (14) and of a snap ring (13), in order to allow extended operation of the booster after a sharp braking action.

3 Claims, 3 Drawing Sheets

PNEUMATIC SERVOMOTOR WITH CONTROLLED POWER-ASSIST POSITIONING

The present invention relates to a pneumatic brake booster.

More specifically, the invention relates to a brake booster comprising: a rigid casing; a moving partition delimiting, in leaktight fashion, a front chamber and a rear chamber inside the casing, the front chamber in operation being permanently connected to a first pressure source delivering a first pressure; a pneumatic piston moving with the moving partition and having a hub slideably mounted in an opening of the casing; an operating rod that can move in the hub between a position of rest and an actuating position as a function of a resultant of forces which acts on it and which comprises an input force exerted in an axial actuating direction directed towards the front chamber and a main return force exerted by a main spring in an axial return direction, the opposite of the axial actuating direction; a plunger housed in a bore of the hub and driven by the operating rod; and a three-way valve itself comprising a fixed annular seat formed on an internal periphery of the hub, a moving annular seat, concentric with the fixed seat and borne by the plunger, and a tubular shutter, concentric with the plunger and with the hub, and exhibiting a frontal annular shut-off face, this frontal face interacting selectively with the moving seat to isolate the rear chamber from a second pressure source delivering a second pressure higher than the first, and this frontal face interacting selectively with the fixed seat to allow the rear chamber to be connected to the second pressure source.

Devices of this type are well known in the prior art, as illustrated, for example, in patent documents U.S. Pat. No. 3,470,697, FR-2,532,084 and FR-2,658,466.

Recent research has shown that a great many drivers, when confronted with an emergency-braking situation, underestimate the actual risks involved and, having braked sharply, relax their braking under circumstances where sustaining heavy braking would, on the contrary, have been absolutely essential to avoid the accident.

This observation has led to the development of various solutions tending to alleviate any ill-advised behaviour of an inexperienced or panic-stricken driver.

The invention falls within this context and its purpose is to provide a simple solution to the problem of sustaining a heavy braking force following a violent braking action.

To this end, the booster of the invention, which in other respects conforms to the definition given in the preamble above, is essentially characterized in that the plunger comprises a cylindrical body secured to the operating rod and a collar of determined axial length, mounted to slide axially with respect to the cylindrical body between a front stop and a rear stop of the body, an anterior section of the collar being engaged between the cylindrical body and the bore of the hub, a posterior section of the collar forming a flange on which the moving seat is defined, and the front stop and rear stop being separated from one another by a distance that exceeds the axial length of the collar, in that a secondary spring exerts on the flange a secondary return force directed in the axial return direction and urging the flange towards the rear stop, and in that the bore in the hub and the collar comprise first and second respective reversible-retention means capable of keeping the collar stationary with respect to the bore in the hub in spite of the secondary return force exerted on the collar and consequently allowing the rear chamber to be connected to the second pressure source, these retention means being activated by the collar being pushed into the bore by an amount at least equal to a minimum determined travel, and being deactivated by the collar being driven along by the front stop when this front stop moves in the axial return direction under the effect of the main return force.

In a preferred embodiment of the invention, the retention means comprise an open elastic ring and an annular channel in which this ring can be housed temporarily, exerting an elastic compression force in the channel.

For example, the ring is housed in an internal groove of the bore of the hub and the channel is defined on the cylindrical body.

Other features and advantages of the invention will emerge clearly from the description thereof given hereafter by way of non-limiting indication, with reference to the appended drawings, in which.

Figure 1:
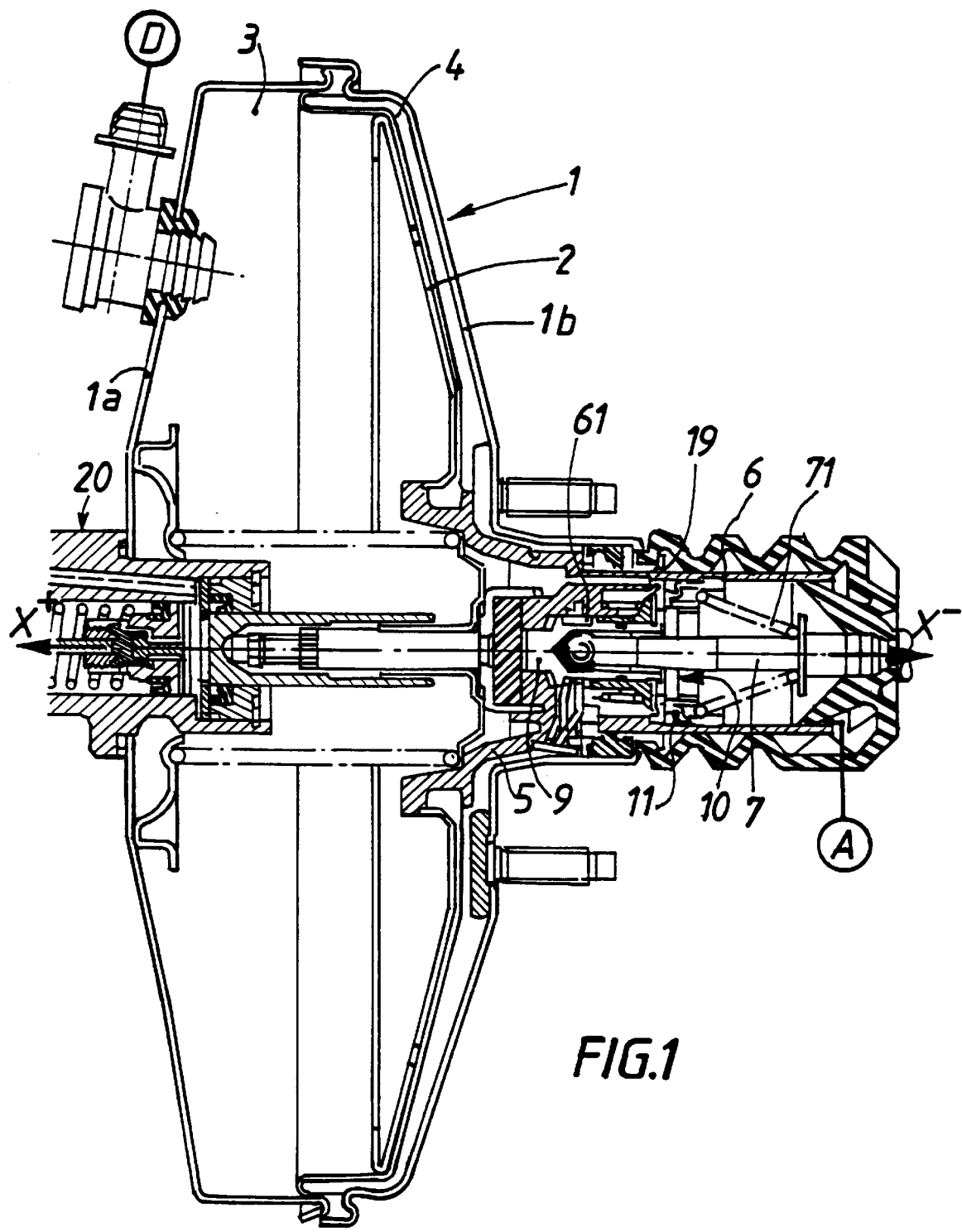
FIG. 1 is a sectional view through a booster in accordance with the invention.

The pneumatic booster of the invention comprises, in the way known per se, a front shell 1a and a rear shell 1b which together form a rigid casing 1.

A moving partition 2 divides the inside of this rigid casing 1 in leaktight fashion and therein delimits a front chamber 3 and a rear chamber 4, the front chamber 3 in operation being connected to a first pressure source D which delivers a first, relatively low, pressure Pd.

A pneumatic piston 5 moves with the moving partition 2 and has a hub 6 slideably mounted in an opening 19 of the casing 1.

The booster is operated by an operating rod 7 that can move in the hub 6 between a position of rest (FIGS. 1 and 2) and an actuating position (FIG. 3), the position of this rod depending both on an input force Fe which is applied to this rod, in an axial actuating direction X+, by the brake pedal (not depicted), and on a return force Frp exerted in the opposite direction X− by a main return spring 71.

A plunger 9, driven by the operating rod 7, is slideably mounted in a bore 61 of the hub 6 to control the state of a three-way valve 10.

This valve 10 essentially consists (FIGS. 2 and 3) of a fixed annular seat 101 formed at the internal periphery of the hub 6, a moving annular seat 102, which is concentric with the fixed seat 101 and borne by the plunger 9, and a tubular shutter 11, which is itself concentric both with the plunger and the hub.

The tubular shutter 11 has a frontal annular shut-off face 111 intended to interact, depending on the position of the plunger 9, either with the moving seat 102 or with the fixed seat 101.

When the booster is at rest (FIGS. 1 and 2), the frontal face 111 of the shutter 11 rests on the moving seat 102 and isolates the rear chamber 4 from a second pressure source A, generally consisting of the atmosphere, and which delivers a pressure Pa which is higher than the pressure Pd of the first source D.

By contrast, when an input force Fe appreciably higher than the return force Frp of the spring 71 is exerted on the rod 7, this force Fe causes the plunger 9 to move in the actuating direction X+, which means that the frontal face 111 of the shutter 11 moves off the moving seat 102, resting on the fixed seat 101 (FIG. 3), the rear chamber 4 then finding itself connected to the pressure source A.

The ingress of air into the rear chamber pushes the moving partition 2 back in the actuating direction X+ and generates a boost force used to actuate the master cylinder 20.

Figure 2:
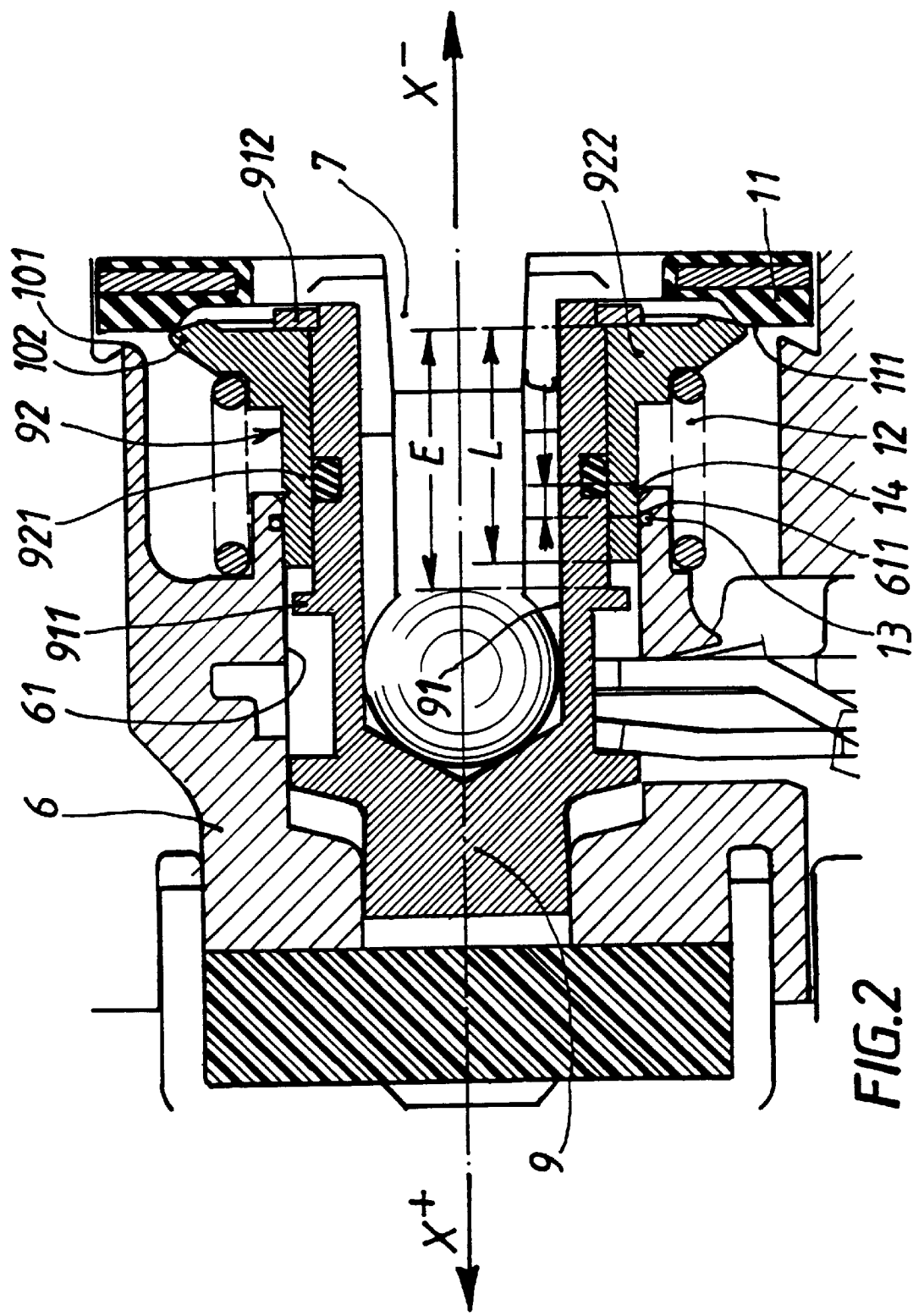
FIG. 2 is a sectional view through a plunger of a booster in accordance with the invention, observed at rest.
Figure 3:
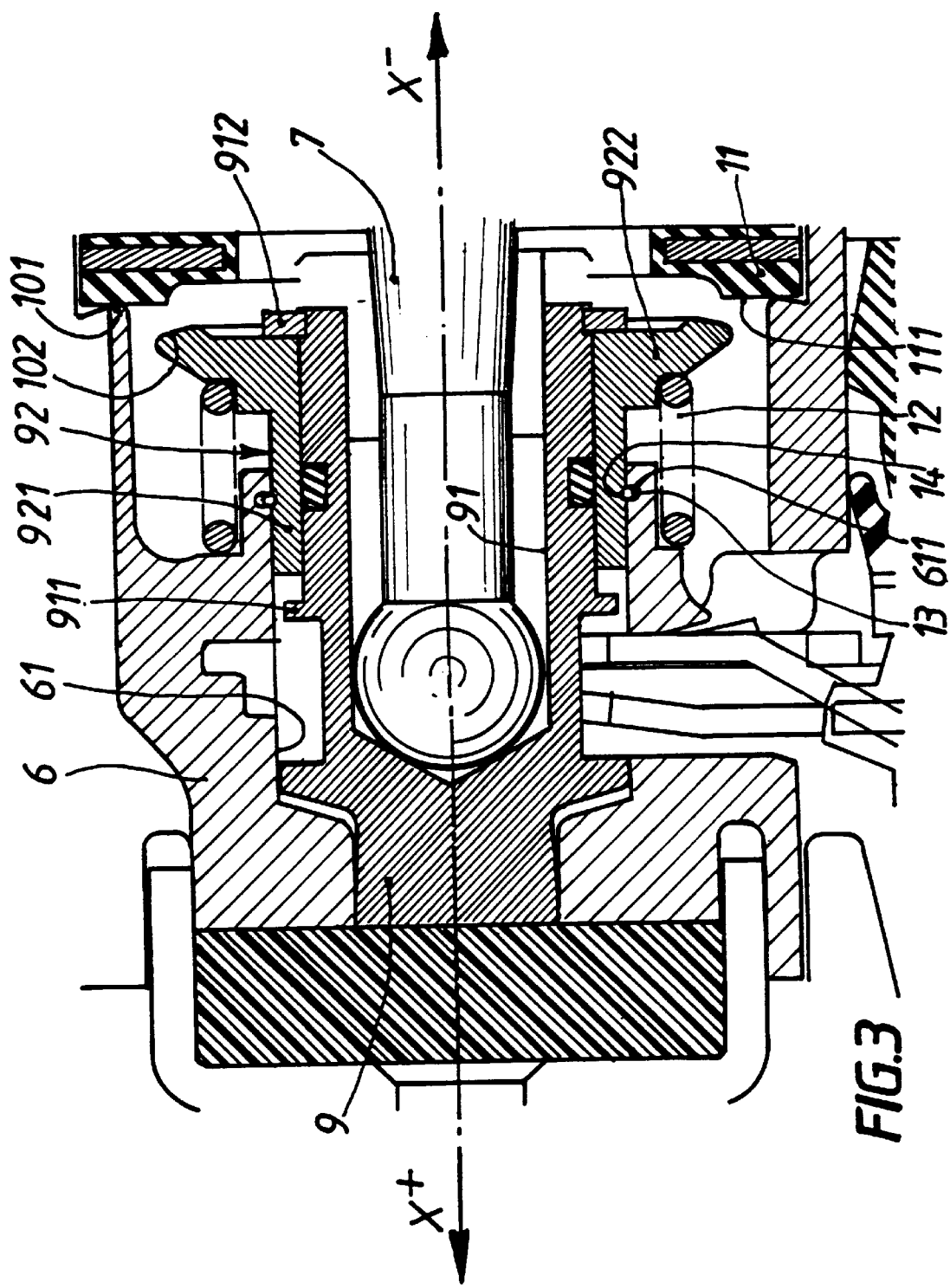
FIG. 3 is a sectional view through the plunger of the booster partially illustrated in FIG. 2, observed in operation.

According to the invention, as best shown by FIGS. 2 and 3, the plunger 9 comprises a cylindrical body 91, secured to the operating rod 7, and a collar 92 of determined axial length L.

The collar 92 is mounted to slide axially in leaktight fashion on the outside of the cylindrical body 91, between a front stop 911 and a rear stop 912, both borne by the body 91, this front stop 911 and this rear stop 912 being separated from one another by a distance E which exceeds the axial length L of the collar 92.

An anterior section 921 of the collar 92 is engaged in the annular space separating the cylindrical body 91 from the bore 61 of the hub, and completely fills this space in a radial direction.

A posterior section 922 of the collar 92 is shaped as a flange and bears the moving seat 102.

A secondary return spring 12 exerts on the flange 922 a secondary return force Frs directed in the axial return direction X− and urging the flange 922 towards the rear stop 912.

An open elastic ring 13, for example consisting of a steel snap ring of circular cross-section, is housed in an internal groove 611 of the bore 61 of the hub to interact with a channel 14 defined at the periphery of the collar 92, this channel having a depth which is less than the radius of the cross-section of the ring 13.

The ring 13, which is intended to be housed temporarily in the channel 14, is sized to exert in this channel an elastic compression force strong enough to keep the collar 92 stationary with respect to the bore 61 of the hub by resisting the secondary return force Frs exerted on the collar by the spring 12, but which is not strong enough to keep the collar 92 stationary with respect to the bore 61 of the hub against the main return force Frp exerted on the rod by the spring 71, the elastic ring 13 and the channel 14 thus constituting means of reversibly retaining the ring with respect to the bore 61 of the hub 6.

The way in which this special arrangement works is as follows.

When a high input force Fe is applied sharply to the operating rod 7, the plunger 9 covers, with respect to the hub 6 of the piston 5, a travel at least equal to the minimum travel C which at rest separates the ring 13 from the channel 14.

The collar 92, driven by the rear stop 912 in the actuating direction X+ is pushed into the bore 61 in such a way that the channel 14 reaches or even travels axially beyond the ring 13, the moving seat 102 throughout this time being very distant from the frontal face 111 of the shutter 11, and the rear chamber 4 therefore being connected to the second pressure source A.

Whether or not the channel 14 has travelled beyond the ring 13 during this emergency braking action, the ring 13 drops into the channel 14 when the brake pedal begins to be released, that is to say when the input force Fe decreases, this situation being illustrated in FIG. 3.

However, as the axial length L of the collar 92 is smaller than the distance E separating the front stop 911 and rear stop 912, the subsequent decrease in input force Fe, and therefore return movement of the plunger 9 in the direction X−, temporarily have no effect on the relative positions of the ring 13, the channel 14, the moving seat 102 and the frontal face 111, which positions remain those illustrated by FIG. 3 for as long as the front stop 911, drawn by the main return force Frp of the spring 71, does not itself pull on the collar 92 and uncover the channel 14 of the ring 13.

Thanks to this arrangement, it is therefore possible to keep the valve 10 wide open for most of the brake-release phase that follows an emergency braking action, and therefore to continue to apply a braking force that is very much higher than the force that would be obtained, without this arrangement, by the braking effort actually supplied by the driver.

What is claimed is:

1. Pneumatic brake booster comprising: a rigid casing (1); a moving partition (2) delimiting, in leaktight fashion, a front chamber (3) and a rear chamber (4) inside the casing (1), the front chamber (3) in operation being permanently connected to a first pressure source (D) delivering a first pressure (Pd); a pneumatic piston (5) moving with the moving partition (2) and having a hub (6) slideably mounted in an opening (19) of the casing (1); an operating rod (7) that can move in the hub (6) between a position of rest and an actuating position as a function of a resultant of forces which acts on it and which comprises an input force (Fe) exerted in an axial actuating direction (X+) directed towards the front chamber (3) and a main return force (Frp) exerted by a main spring (71) in an axial return direction (X−), the opposite of the axial actuating direction (X+); a plunger (9) housed in a bore (61) of the hub (6) and driven by the operating rod; and a three-way valve (10) itself comprising a fixed annular seat (101) formed on an internal periphery of the hub (6), a moving annular seat (102), concentric with the fixed seat (101) and borne by the plunger (9), and a tubular shutter (11), concentric with the plunger and with the hub, and exhibiting a frontal annular shut-off face (111), this frontal face (111) interacting selectively with the moving seat (102) to isolate the rear chamber (4) from a second pressure source (A) delivering a second pressure (Pa) higher than the first (Pb), and this frontal face (111) interacting selectively with the fixed seat (101) to allow the rear chamber (4) to be connected to the second pressure source (A), characterized in that the plunger (9) comprises a cylindrical body (91) secured to the operating rod (7) and a collar (92) of determined axial length (L), mounted to slide axially with respect to the cylindrical body (91) between a front stop (911) and a rear stop (912) of the body, an anterior section (921) of the collar (92) being engaged between the cylindrical body (91) and the bore (61) of the hub, a posterior section (922) of the collar (92) forming a flange on which the moving seat (102) is defined, and the front stop (911) and rear stop (912) being separated from one another by a distance (E) that exceeds the axial length (L) of the collar (92), in that a secondary spring (12) exerts on the flange (922) a secondary return force (Frs) directed in the axial return direction (X−) and urging the flange (922) towards the rear stop (912), and in that the bore (61) in the hub and the collar (92) comprise first and second respective reversible-retention means (13, 14) capable of keeping the collar (92) stationary with respect to the bore (61) in the hub in spite of the secondary return force (Frs) exerted on the collar and consequently allowing the rear chamber (4) to be connected to the second pressure source (A), these retention means being activated by the collar being pushed into the bore (61) by an amount at least equal to a minimum determined travel (C), and being deactivated by the collar (92) being driven along by the front stop (911) when this front stop moves in the axial return direction (X−) under the effect of the main return force (Frp).

2. Booster according to claim 1, characterized in that the retention means (13, 14) comprise an open elastic ring (13) and an annular channel (14) in which this ring (13) can be housed temporarily, exerting an elastic compression force in the channel.

3. Booster according to claim 2, characterized in that the ring (13) is housed in an internal groove (611) of the bore (61) of the hub and in that the channel (14) is defined on the collar (92).

\* \* \* \* \*